(12) United States Patent
Tofaute

(10) Patent No.: US 12,015,167 B2
(45) Date of Patent: Jun. 18, 2024

(54) BATTERY MODULE HAVING A HOUSING COMPONENT THAT DELIMITS A MODULE INTERIOR

(71) Applicant: WEBASTO SE, Stockdorf (DE)

(72) Inventor: Tobias Tofaute, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 622 days.

(21) Appl. No.: 17/276,481

(22) PCT Filed: Sep. 19, 2019

(86) PCT No.: PCT/EP2019/075140
§ 371 (c)(1),
(2) Date: Mar. 15, 2021

(87) PCT Pub. No.: WO2020/058386
PCT Pub. Date: Mar. 26, 2020

(65) Prior Publication Data
US 2022/0045393 A1    Feb. 10, 2022

(30) Foreign Application Priority Data

Sep. 19, 2018   (DE) ..................... 10 2018 122 984.4

(51) Int. Cl.
*H01M 50/249* (2021.01)
*H01M 50/204* (2021.01)
*H01M 50/224* (2021.01)
*H01M 50/227* (2021.01)
*H01M 50/244* (2021.01)

(52) U.S. Cl.
CPC ....... *H01M 50/249* (2021.01); *H01M 50/204* (2021.01); *H01M 50/224* (2021.01); *H01M 50/227* (2021.01); *H01M 50/244* (2021.01); *H01M 2220/20* (2013.01)

(58) Field of Classification Search
CPC combination set(s) only.
See application file for complete search history.

(56) References Cited

U.S. PATENT DOCUMENTS

| 2010/0104933 A1* | 4/2010 | Unterdorfer | ........ H01M 50/258 |
|---|---|---|---|
|  |  |  | 429/120 |
| 2013/0344359 A1* | 12/2013 | Ledbetter | .......... H01M 10/6556 |
|  |  |  | 429/100 |

(Continued)

FOREIGN PATENT DOCUMENTS

| CN | 101647135 A | 2/2010 |
| CN | 103253119 A | 8/2013 |
| DE | 102011016799 A1 | 3/2012 |

(Continued)

OTHER PUBLICATIONS

First Office Action for Chinese Patent Application No. 201980061272.3 dated Aug. 2, 2022; 8 pages.

(Continued)

*Primary Examiner* — Daniel S Gatewood
(74) *Attorney, Agent, or Firm* — Haynes and Boone, LLP

(57) ABSTRACT

A battery module includes a housing component that delimits a module interior and is intended for accommodating at least one module component. The housing component is formed as one piece and delimits the module interior at least on three sides.

15 Claims, 2 Drawing Sheets

(56) References Cited

U.S. PATENT DOCUMENTS

2018/0013111 A1    1/2018   Wuensche et al.
2018/0083253 A1    3/2018   Dulle

FOREIGN PATENT DOCUMENTS

| DE | 202014102895 U1 | 7/2014 | |
| --- | --- | --- | --- |
| DE | 202014102895 U1 * | 9/2014 | .......... B60L 11/1879 |
| DE | 102015109647 A1 | 12/2015 | |
| DE | 102015121520 A1 | 7/2016 | |
| DE | 102016113597 A1 | 2/2017 | |
| WO | WO 2008106948 A1 | 9/2008 | |
| WO | WO 2014004739 A1 | 1/2014 | |

OTHER PUBLICATIONS

Chinese Patent Application No. 201980061272.3, $3^{rd}$ Office Action dated Jun. 26, 2023; 9 pages.
International Search Report and Written Opinion for International Patent Application No. PCT/EP2019/075140 dated Nov. 28, 2019, 11 pages.

* cited by examiner

BATTERY MODULE HAVING A HOUSING COMPONENT THAT DELIMITS A MODULE INTERIOR

CROSS REFERENCE TO RELATED APPLICATIONS

This application is a national stage of International Application No. PCT/EP2019/075140 filed Sep. 19, 2019, which claims priority from German Patent Application 10 2018 122 984.4 filed Sep. 19, 2018 in the German Patent and Trademark Office, the disclosures of which are incorporated herein by reference in their entirety.

BACKGROUND

Technical Area

The present invention relates to a battery module having a housing component that delimits a module interior and is intended for accommodating at least one module component such as for example battery cells, power electronics, a battery control system, an air conditioning system and/or cabling. The present invention furthermore relates to a traction battery for a motor vehicle, for example a passenger car, a bus and/or a commercial vehicle.

Related Art

It is important during the course of electrifying vehicles to optimize the installation space required for the traction batteries that are installed in the vehicle. In so doing, on the one hand, a greatest possible capacity of the traction battery is to be realized in order to provide a long travel range. The greater the number of battery cells that can be installed in the vehicle, the greater also can be the available battery capacity. On the other hand, however, the usable volume and the volume of the passenger compartment are to be as large as possible.

Accordingly, it is known to design traction batteries with housings that are adapted to suit the respective available installation space of the respective vehicle. Consequently, the housings that must accommodate the module components that are required to meet the respective specification of the traction battery are correspondingly different in size and shape.

Battery cells are in this case usually combined in the battery modules. It is then usual for multiple battery modules that are fitted with battery cells to be installed in the housing of the traction battery and to be electrically connected to one another and to be connected to power electronics and/or an electronic control system likewise installed in the housing.

In addition to the battery modules that accommodate the battery cells, there is also a plurality of other module components such as for example power electronics, power connectors and an electronic control system, which are likewise to be accommodated and installed in the battery in order to ultimately form the traction battery.

DE 10 2015 121 520 A1 describes a modular battery pack and also a method for producing such a battery pack. Prismatic box-shaped battery cells are arranged within a housing in such a manner that it is possible to provide the housing and its components in a reconfigurable format without the need for a new construction. This renders it possible for battery packs that contain a different number of battery modules or battery cells to be placed within the common housing.

SUMMARY

A battery module that renders it possible to install a traction battery in a flexible manner for the respective application purpose is described herein according to various embodiments.

Accordingly, a battery module having a housing component that delimits a module interior is proposed for accommodating at least one module component. In accordance with the present disclosure, the housing component is formed as one piece and delimits the module interior on at least three sides.

This renders it possible to produce a battery module that can be used in a particularly flexible manner and by means of which it is possible in a flexible and efficient manner to produce traction batteries having different specifications and for different application purposes.

By virtue of producing the housing component in a shape which renders it possible to accommodate different module components, it is possible to construct in a mechanical simple manner a traction battery having the respective specifications. For this purpose, it is only necessary to fill the housing components with the module components that are provided for the respective specification and then to join together the individual housing components in a housing so as to produce the traction battery and to install said housing components in the housing.

Upon designing the housing components in a shape that delimits the module interior at least on three sides, it is possible to realize a uniform configuration of the outer shape and of the external dimensions of the battery module. As a result it is possible to realize an efficient and secure assembly of a traction battery from battery modules which can accommodate in their module interior module components that correspond to the respective specification.

The housing of the traction battery and the housing components can always be configured identically, irrespective of the specification of the traction battery. In other words, the different battery modules always have in each case the identical shape factor. This also simplifies the assembly procedure with the result that it can be performed in a reliable and cost-effective manner. It is only necessary for an employee who is assembling the traction battery to insert the individual battery module into the housing of the traction battery and any further spatial adjustments are not necessary.

Furthermore, it has been shown that the one-piece configuration of the housing component in such a manner that it delimits the module interior on at least three sides saves weight. By virtue of this configuration, the housing component is also open on three sides, in other words the battery module is not accommodated in a closed-off housing. It has been shown that as a result the cooling of the module components that are accommodated in the module interior is improved. It is also possible in this manner to improve the accessibility for maintenance purposes with respect to a configuration of the housing components in which the module housing is closed-off.

In accordance with an embodiment, the housing component includes a bottom side and two side walls that extend in a perpendicular manner with respect to the bottom side and are spaced apart from one another. The housing component can thus be configured in a one-piece design in a simple manner.

The housing component includes a molded synthetic material part or is designed as a molded synthetic material part in some embodiments.

The housing component is formed from a bent metal sheet in various embodiments. The housing component can thus be produced as a sheet metal bending part in a cost-effective, stable, light and reliable manner.

A module component for example in the form of battery cells, an power electronics, a battery control system, an air-conditioning system and/or cabling are accommodated in the module interior in several embodiments. It is possible in this manner that a battery module can be embodied such that the respective functions that are to be provided in a traction battery are provided, wherein the respective module components are all accommodated in each case in the uniformly configured housing components.

It is also possible in this manner to realize a modular construction of the traction battery in a simple manner, since the individual functions of the different module components of the traction battery are provided in each case with the identical shape factor. It is thus possible to realize a scalable construction of the traction battery in a simple manner. For example, a battery module in which control components are accommodated can be combined with an arbitrary number of battery modules in which battery cells are accommodated. In this case, the actual mechanical assembly layout of the traction battery remains the same, only the number of battery modules that are to be installed in the housing varies.

Attachments areas are, in certain embodiments, integrated in the housing component and a module component can be attached to the attachment areas, wherein the attachment areas are typically designed as one piece with the housing component. By virtue of providing the attachment areas, it is possible for the respective module components to be fixedly connected to the housing components. Consequently, battery modules can also be provided pre-assembled so that the traction battery can be constructed in an efficient manner and uncoupled in terms of location and time.

The attachment areas are usually provided for attaching at least two different module components. In other words, the housing components are configured in such a manner that they are arranged for attaching different module components. Consequently, one single type of housing components can be used for the construction of an entire traction battery. Consequently, there are more carry over parts with the result that the traction battery can ultimately be constructed in a particularly efficient manner.

In a further embodiment, mounting areas are integrated in the housing component for the purpose of mounting the battery module in a housing of a traction battery, wherein the mounting areas are generally provided on a bottom side of the housing component. The mounting areas that are integrated in the housing components render it possible for the battery module to be connected to a housing of a traction battery in a simple manner. As a consequence, the number of components that are required to attach the battery modules to the housing can be reduced.

A traction battery including a housing is also described herein according to various embodiments. In accordance with the present disclosure, at least two battery modules are installed in the housing in one of the above described embodiments.

Accordingly, at least two, more than two or generally all the battery modules that are to be accommodated in the housing of the traction battery can be provided in each case with one of the above described housing components. It is thus possible to realize a construction of the traction battery that is particularly efficient.

At least one battery cell is accommodated in a first of the battery modules that are accommodated in the housing and that power electronics, a battery control system, an air-conditioning system and/or cabling are accommodated in a second of the battery modules are accommodated in the housing in some embodiments.

BRIEF DESCRIPTION OF THE FIGURES

Further embodiments of the invention are explained in detail by the description of the figures below.

DETAILED DESCRIPTION

Further embodiments are described below with reference to the figures. In so doing, like, similar or similarly acting elements are provided in the different figures with identical references, and a repeated description of these elements is partially omitted in order to avoid redundancies.

Figure 1A:
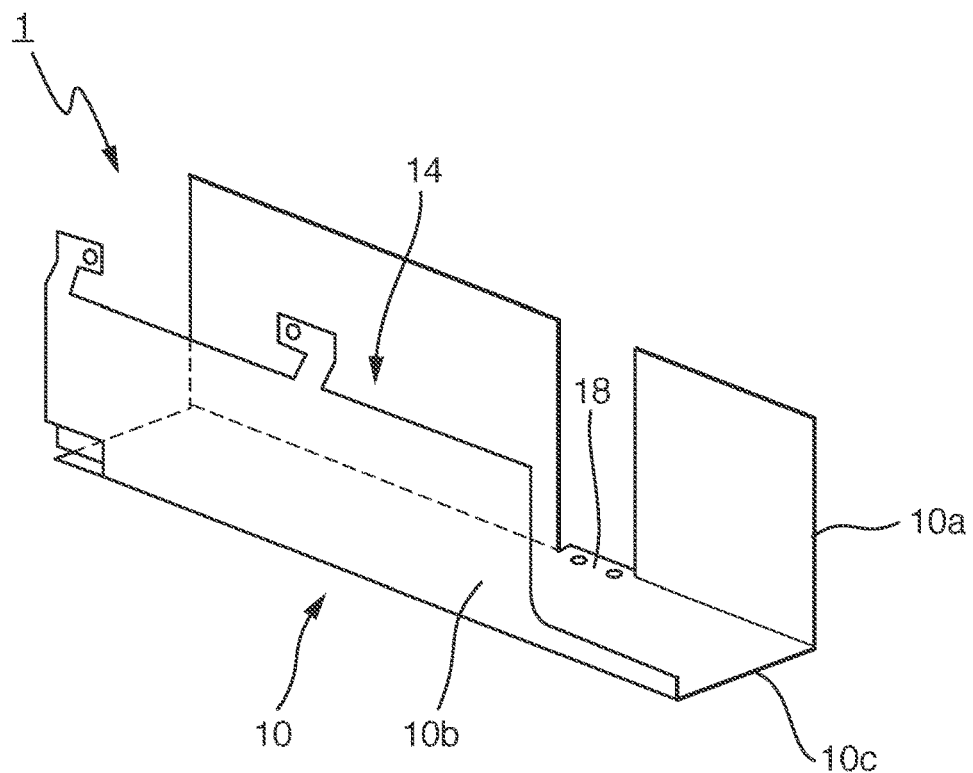
FIGS. 1a, 1b show perspective views of a housing component for a battery module in accordance with an exemplary embodiment, wherein the views are taken from two opposite directions.
Figure 1B:
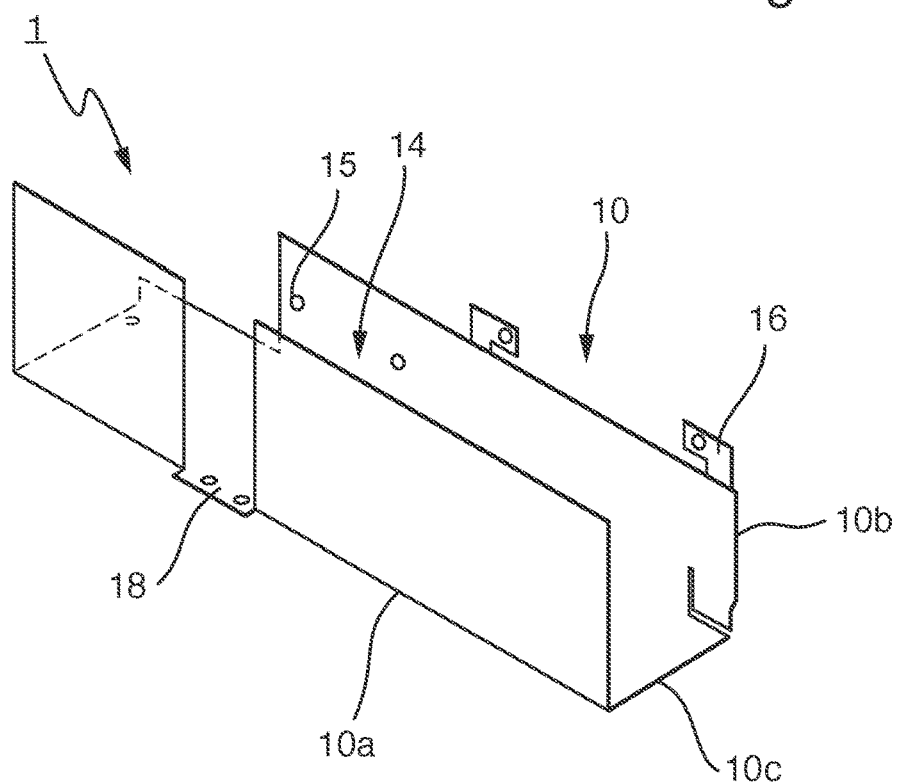

FIGS. 1a and 1b illustrate schematically a perspective view of a battery module 1 from two opposite viewing directions.

Figure 2:
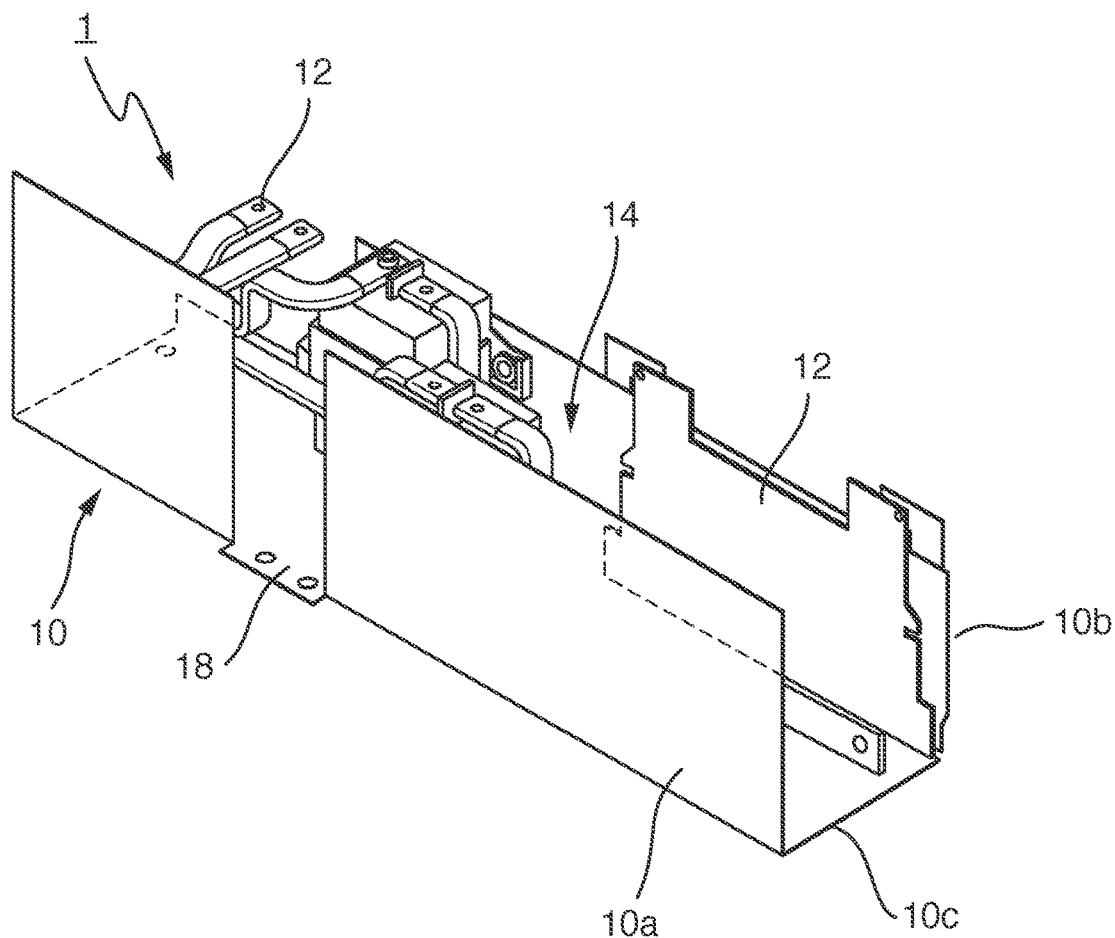
FIG. 2 shows a perspective view of a battery module in accordance with a further exemplary embodiment.

The battery module 1 includes a housing component 10 that is configured so as to delimit a module interior 14. Module components 12 that are schematically indicated in FIG. 2 can be accommodated and installed in the module interior 14 in order to ultimately form a traction battery.

The module components 12 can be for example battery cells, power electronics, a battery control system and/or cabling and also other electrical and electronic components that are required for constructing a traction battery. The module components 12 can also be components for an air-conditioning system for enabling air conditioning of the module components 12 accommodated in the traction battery.

The housing component 10 delimits the module interior 14 on at least three sides and is formed in one piece.

For this purpose, the housing component 10 includes a bottom side 10c and two side walls 10a, 10b that extend spaced apart from one another and in a perpendicular manner with respect to the bottom side 10c. Consequently, the housing component 10 in the illustrated embodiment has a U-shaped cross-section in order to accordingly define the module interior 14.

The housing component 10 can be provided in the form of a bent metal sheet. The configuration as a sheet metal bending part renders it possible to configure the housing component 10 in a simple, mechanically stable, light and reliable manner. The housing component 10 can thus be configured as a standard part for constructing a traction battery in order in this way to realize an efficient construction of the traction battery using a largest possible number of carry over parts.

As a result of the embodiment of the housing component 10 having at least three delimiting sides, the housing component 10 is accordingly open on up to three sides. The battery module 1 therefore includes a box-like and closed housing, whereby the cooling of and access to the module components 12 that are accommodated in the housing component 10 are improved.

In one embodiment, the side walls 10a, 10b include cutouts 15. As a result, the cooling procedure is still further optimized. In a further example, the sidewalls 10a, 10a are reinforced in specific areas. These reinforced areas can be used for example for attaching to another component.

The module component 12 can be battery cells, power electronics, a battery control system and/or cabling. These are each accommodated in the module interior 14 of the battery module 1. In a further embodiment, it is for example also possible to arrange multiple module components 12 in the same battery module 1.

Attachment areas 16 are integrated in the housing component 10 and a module component 12 can be attached to the attachment areas, wherein the attachment areas 16 are generally designed as one piece with the housing component 10. The attachment area 16 can be provided for example in the form of cutouts or attachment holes to which it is possible to attach a module component 12.

An exemplary embodiment arises if threads are already formed or cut in the attachment areas 16, so as to render it possible to screw the module components 12 using attachment means in the form of screws or bolts directly into the attachment areas 16 that include the thread.

In another exemplary embodiment, attachment areas 16 are provided for attaching at least two different module components 12. Consequently, it is possible as desired to attach different module components 12 in a housing component 10 of a predetermined type. In other words, a housing component 10 can be used for accommodating different module components 12 without having to modify the housing component 10 for this purpose.

This results in a greater number of carry over parts when constructing a traction battery since different battery modules 1 can be constructed using the respective identical housing components 10.

Furthermore, in the illustrated embodiment, mounting areas 18 are integrated in the housing component 10 for mounting the battery module 1 in a housing 22 of a traction battery 20 (see FIG. 3), wherein the mounting areas 18 are provided on the bottom side 10c of the housing components 10.

It is possible by means of the mounting areas 18 to mount the individual battery module 1 in a housing 20 of a traction battery without having to attach additional mounting elements to the housing component 10. The mounting areas 8 are similar to the attachment areas 16—generally provided in the form of a mounting hole that can also be provided with a thread that is formed or cut therein.

FIG. 2 illustrates a battery module 1 after the module components 12, which are indicated schematically, are inserted into the housing component 10.

Figure 3:
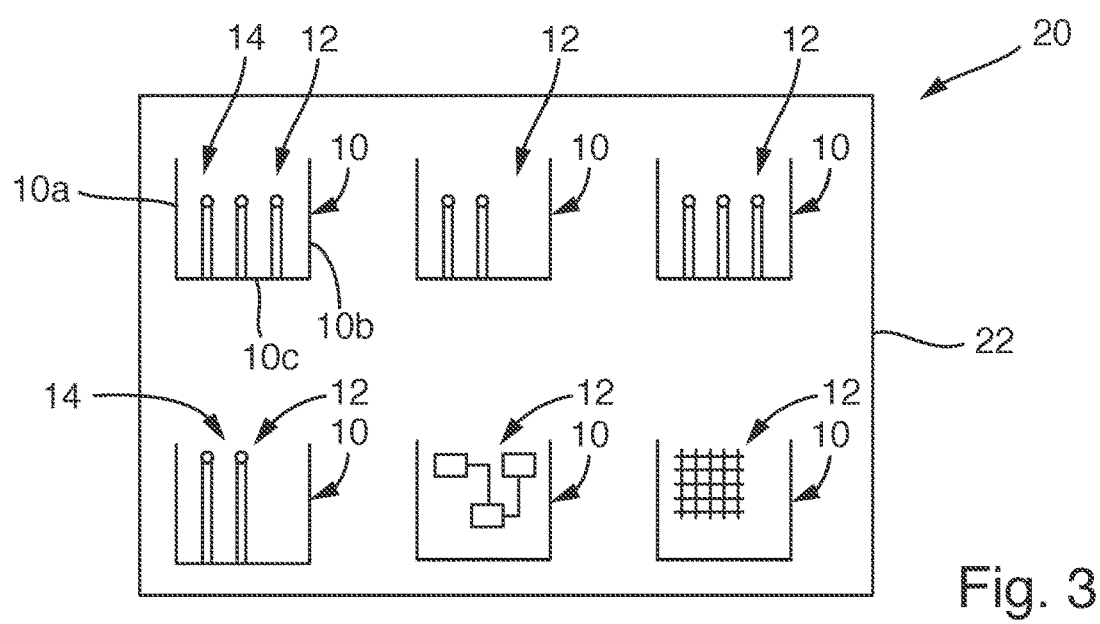
FIG. 3 shows a schematic sectional view of a traction battery in accordance with a further aspect.

FIG. 3 illustrates a traction battery 20 including a housing 22 wherein at least two battery modules 1 are arranged in the housing 22.

In one example, the traction battery 20 includes a plurality of battery cells in one or multiple battery modules 1 and in further battery modules 1 it includes a control device and in a further battery module 1 it includes a cooling device.

In one example, the battery modules 1 are connected to one another via conducts (not illustrated) within the housing 22 of the traction battery 20.

In one example, the housing 22 of the traction battery 20 has a standardized size that corresponds to the respective vehicle.

In one example, the battery modules 1 are arranged in rows adjacent to one another in the longitudinal direction of the housing 22. In the example illustrated here, the battery modules 1 are also arranged one above the other in a stacked form and in a row adjacent to one another.

In accordance with one embodiment, the housing 22 with the at least two battery modules 1 is arranged on a vehicle structure (not illustrated).

Where applicable, all individual features that are illustrated in the embodiments can be combined with one another and/or exchanged without abandoning the scope of the invention.

The invention claimed is:

1. A battery module comprising:
    a housing component that delimits a module interior and is configured to accommodate at least one module component,
    wherein:
        the housing component is formed as one piece and delimits the module interior on at least three sides,
        the housing component has a bottom side and two side walls that extend spaced apart from one another and in a perpendicular manner with respect to the bottom side,
        the housing component comprises mounting areas integrated in the housing component,
        the mounting areas are configured to mount the battery module in a housing of a traction battery, and
        the mounting areas are located on the bottom side of the housing component.

2. The battery module of claim 1, wherein the two side walls comprise cutouts.

3. The battery module of claim 1, wherein the housing component is formed as a bent metal sheet.

4. The battery module of claim 1, wherein the housing component comprises a molded material or is formed as a molded part.

5. The battery module of claim 1, wherein the module interior accommodates the at least one module component, and the at least one module component comprises battery cells, power electronics, a battery control system, an air-conditioning system, and/or cables.

6. The battery module of claim 1, wherein the housing component comprises attachment areas configured to attach the at least one module component.

7. The battery module of claim 6, wherein the attachment areas are formed as one piece with the housing component.

8. The battery module of claim 6, wherein the at least one module component comprises at least two different module components.

9. A traction battery comprising:
    a housing; and
    at least two battery modules,
    wherein:
        the at least two battery modules are mounted in the housing,
        each battery module comprises a housing component that delimits a module interior and is configured to accommodate at least one module component, wherein the housing component is formed as one piece and delimits the module interior on at least three sides,
        the housing component has a bottom side and two side walls that extend spaced apart from one another and in a perpendicular manner with respect to the bottom side,
        the housing component comprises mounting areas integrated in the housing component,
        the mounting areas are configured to mount the battery module in the housing of the traction battery, and
        the mounting areas are located on the bottom side of the housing component.

10. The traction battery of claim 9, wherein a first battery module of the at least two battery modules accommodates at least one battery cell and a second battery module of the at least two battery modules accommodates a battery control system, an air-conditioning system and/or cables.

11. The traction battery of claim 9, wherein the at least two battery modules are arranged in rows adjacent to one another in a longitudinal direction of the housing.

12. The traction battery of claim 9, wherein the at least two battery modules are arranged one above the other.

13. The traction battery of claim 9, wherein the housing component is formed as a bent metal sheet.

14. The traction battery of claim 9, wherein the housing component comprises attachment areas configured to attach the at least one module component.

15. The traction battery of claim 14, wherein the attachment areas are formed as one piece with the housing component.

\* \* \* \* \*